US012785561B2

(12) United States Patent
Wu et al.

(10) Patent No.: US 12,785,561 B2
(45) Date of Patent: Nov. 3, 2026

(54) POWER CONVERTER HAVING NEGATIVE CURRENT CONTROL MECHANISM

(71) Applicant: ANPEC ELECTRONICS CORPORATION, Hsinchu (TW)

(72) Inventors: Cheng-Han Wu, Hsinchu (TW); Fu-Chuan Chen, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 171 days.

(21) Appl. No.: 18/824,857

(22) Filed: Sep. 4, 2024

(65) Prior Publication Data

US 2025/0392200 A1 Dec. 25, 2025

(30) Foreign Application Priority Data

Jun. 19, 2024 (TW) ................................ 113122588

(51) Int. Cl.
*H02M 3/158* (2006.01)
*H02M 1/00* (2007.01)
*H02M 3/156* (2006.01)

(52) U.S. Cl.
CPC ......... *H02M 3/158* (2013.01); *H02M 1/0025* (2021.05); *H02M 3/1566* (2021.05)

(58) Field of Classification Search
CPC .... H02M 3/156; H02M 3/158; H02M 1/0025; H02M 3/1566; H02M 1/0032
See application file for complete search history.

(56) References Cited

U.S. PATENT DOCUMENTS

| | | | | |
|---|---|---|---|---|
| 9,831,702 | B2 * | 11/2017 | Chen | H02M 3/158 |
| 10,122,278 | B1 * | 11/2018 | Xue | H02M 3/158 |
| 10,797,598 | B1 * | 10/2020 | Malla | H02M 3/158 |
| 2004/0095105 | A1 * | 5/2004 | Nakata | G05F 1/56 323/280 |
| 2014/0084886 | A1 * | 3/2014 | Causse | H02M 3/158 323/282 |
| 2015/0008895 | A1 * | 1/2015 | Weng | H02M 3/156 323/285 |
| 2015/0280567 | A1 * | 10/2015 | Fukumoto | H02M 3/156 323/271 |
| 2016/0373007 | A1 * | 12/2016 | Lu | H02M 1/36 |
| 2021/0013806 | A1 * | 1/2021 | Yaguchi | H02M 1/08 |

(Continued)

*Primary Examiner* — Gustavo A Rosario-Benitez
(74) *Attorney, Agent, or Firm* — Li & Cai Intellectual Property Office

(57) ABSTRACT

A power converter having a negative current control mechanism is provided. The power converter includes an error amplifying circuit, a first comparator, a switch control circuit, a compensation trigger circuit and a compensation current supplying circuit. The error amplifying circuit multiplies a difference between a voltage of a second terminal of an inductor and a reference voltage by a gain to output a first error amplified signal. The first comparator compares a voltage of a first terminal of the inductor with a voltage of the resistor connected to a low-side switch to output a comparison signal. The switch control circuit controls a high-side switch and the low-side switch according to the comparison signal. The compensation trigger circuit, according to the comparison signal, determines whether to trigger the compensation current supplying circuit to supply a compensation current to the resistor according to the first error amplified signal.

17 Claims, 9 Drawing Sheets

(56) References Cited

U.S. PATENT DOCUMENTS

| | | | | |
|---|---|---|---|---|
| 2021/0050790 | A1* | 2/2021 | Talari | H02M 1/32 |
| 2021/0194362 | A1* | 6/2021 | Moctezuma | H02M 3/157 |
| 2022/0255435 | A1* | 8/2022 | Yoon | H02M 3/1582 |
| 2022/0416657 | A1* | 12/2022 | Floriani | H02M 1/0003 |
| 2025/0132681 | A1* | 4/2025 | Sharifi | H02M 1/0009 |

* cited by examiner

POWER CONVERTER HAVING NEGATIVE CURRENT CONTROL MECHANISM

CROSS-REFERENCE TO RELATED PATENT APPLICATION

This application claims the benefit of priority to Taiwan Patent Application No. 113122588, filed on Jun. 19, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a negative current control mechanism.

BACKGROUND OF THE DISCLOSURE

Power converters are indispensable for electronic devices. The power converters are used to adjust power and supply the adjusted power to the electronic devices. A high-side switch and a low side switch of the power converter must be switched according to voltages or currents of circuit components in the power converter such that the power converter supplies appropriate power to a load.

When the load gradually transits from a super light load to a medium load or a heavy load, energy required for the load gradually increases. However, a negative current flowing through an inductor connected to a node between the high-side switch and the low-side switch of a conventional power convertor is maintained at a constant value. The conventional power convertor cannot gradually reduce the negative current flowing through the inductor, which causes unnecessary power consumption. Therefore, the conventional power convertor cannot supply enough power to the load that transits to the medium load or the heavy load from the super light load.

SUMMARY OF THE DISCLOSURE

In response to the above-referenced technical inadequacies, the present disclosure provides a power converter having a negative current control mechanism. The power converter includes a high-side switch, a low-side switch, a power receiving component, an error amplifying circuit, a first comparator, a switch control circuit, a compensation trigger circuit and a compensation current supplying circuit. A first terminal of the high-side switch is coupled with an input voltage. A first terminal of the low-side switch is connected to a second terminal of the high-side switch. A sensed node between the first terminal of the low-side switch and the second terminal of the high-side switch is connected to a first terminal of an inductor. A second terminal of the inductor is connected to a first terminal of an output capacitor. A second terminal of the output capacitor is grounded. A first terminal of the power receiving component is connected to a second terminal of the low-side switch. The error amplifying circuit is configured to multiply a difference between an output voltage of the second terminal of the inductor and a first reference voltage by a first gain to output a first error amplified signal. A first input terminal of the first comparator is connected to the sensed node. A second input terminal of the first comparator is connected to a second terminal of the power receiving component. The first comparator compares a voltage of the sensed node with a voltage of the second terminal of the power receiving component to output a first comparison signal. The switch control circuit is connected to a control terminal of the high-side switch and a control terminal of the low-side switch. The switch control circuit is configured to control a high-side switch and the low-side switch according to the first comparison signal. The compensation trigger circuit is connected to an output terminal of the first comparator. The compensation current supplying circuit is connected to the compensation trigger circuit and the second terminal of the power receiving component. The compensation trigger circuit, according to the comparison signal, determines whether to trigger the compensation current supplying circuit to output a compensation current to the power receiving component according to the first error amplified signal.

As described above, the present disclosure provides the power converter having the negative current control mechanism. In the power converter of the present disclosure, a switching state of the high-side switch and the low-side switch is changed according to a transition in the load between the super light load and the medium load or the heavy load so so to adjust the current flowing through the inductor. In particular, when the load transits from the super light load to the medium load or the heavy load, the power converter of the present disclosure is capable of reducing the negative current (including the valley current) among the current flowing through the inductor for reducing unnecessary power consumption. Therefore, the power converter of the present disclosure is capable of supplying enough power to the load, and the current of the inductor is maintained at the constant value when the input voltage is approximately equal to the output voltage.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
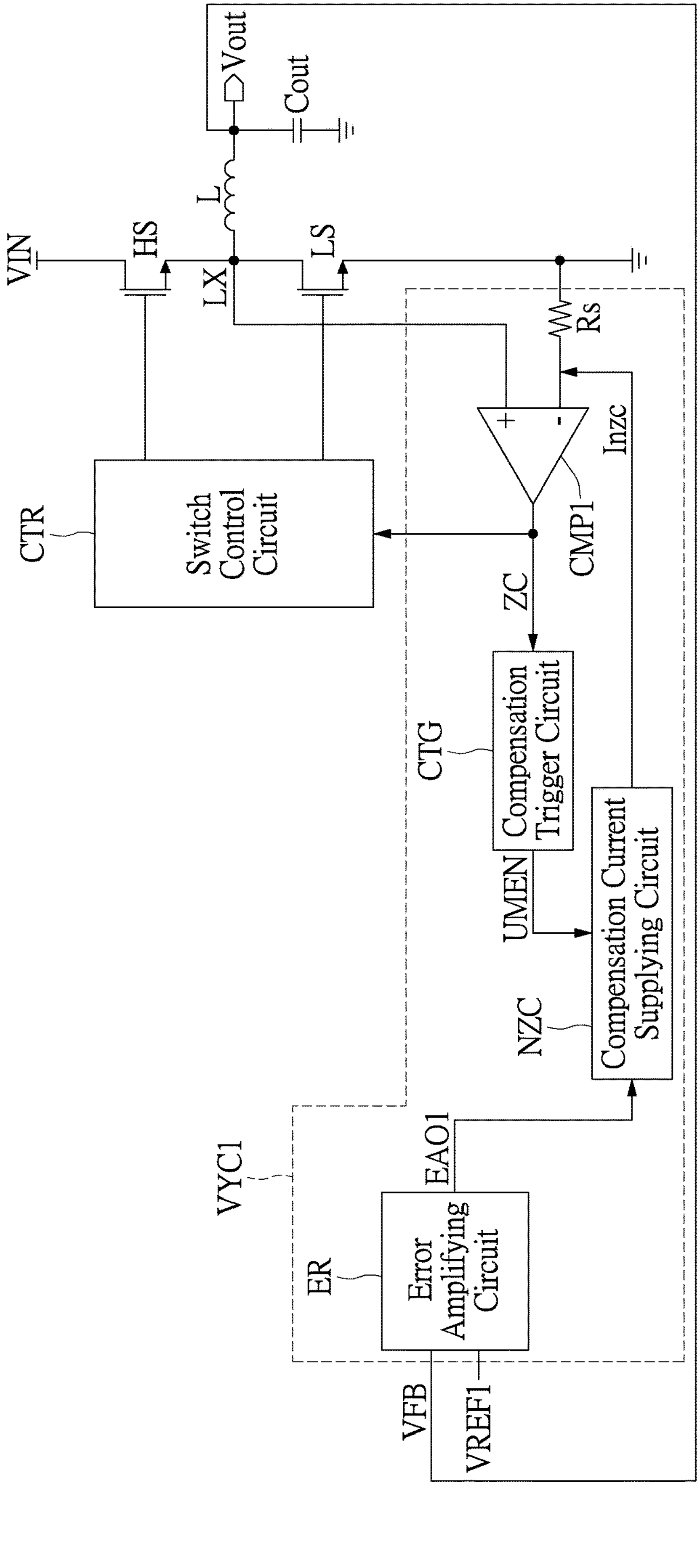
FIG. 1 is a circuit diagram of a power converter having a negative current control mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a power converter of the present disclosure having a negative current control mechanism according to a first embodiment of the present disclosure.

The power converter of the present disclosure includes a high-side switch HS, a low-side switch LS, a switch control circuit CTR and a negative current modulating circuit VYC1 as shown in FIG. 1.

It is worth noting that, as shown in FIG. 1, in the first embodiment, the negative current modulating circuit VYC1 of the power converter of the present disclosure includes an error amplifying circuit ER, a compensation current supplying circuit NZC, a compensation trigger circuit CTG, a first comparator CMP1 and a power receiving component Rs.

A first terminal of the high-side switch HS is coupled with an input voltage VIN. A first terminal of the low-side switch LS is connected to a second terminal of the high-side switch HS. A node between the first terminal of the low-side switch LS and the second terminal of the high-side switch HS is used as a sensed node LX, and is connected to a first terminal of an inductor L. A second terminal of the inductor L is connected to a first terminal of an output capacitor Cout. A second terminal of the output capacitor Cout is grounded.

The power receiving component Rs may be a resistor as shown in FIG. 1, but the present disclosure is not limited thereto. In practice, the power receiving component Rs may include one or more resistors, one or more capacitors or other circuit components each having a voltage that is changed with a change in a compensation current Inzc. A first terminal of the power receiving component Rs is connected to a second terminal of the low-side switch LS.

A first input terminal of the error amplifying circuit ER is connected to the second terminal of the inductor L. A second input terminal of the error amplifying circuit ER is coupled with a first reference voltage VREF1. An output terminal of the error amplifying circuit ER is connected to an input terminal of the compensation current supplying circuit NZC. The error amplifying circuit ER multiplies a difference between the first reference voltage VREF1 and a feedback voltage VFB that is an output voltage Vout of the second terminal of the inductor L by a first gain to output a first error amplified signal EAO1 to the compensation current supplying circuit NZC.

A first input terminal such as a non-inverting input terminal of the first comparator CMP1 is connected to the sensed node LX between the first terminal of the low-side switch LS and the second terminal of the high-side switch HS. A second input terminal such as an inverting input terminal of the first comparator CMP1 is connected to a second terminal of the power receiving component Rs. An output terminal of the first comparator CMP1 is connected to the compensation trigger circuit CTG. The compensation current supplying circuit NZC is connected to the error amplifying circuit ER, the compensation trigger circuit CTG and the second terminal of the power receiving component Rs.

The first comparator CMP1 compares a voltage of the sensed node LX between the first terminal of the low-side switch LS and the second terminal of the high-side switch HS with a voltage of the second terminal of the power receiving component Rs to output a first comparison signal ZC.

The compensation trigger circuit CTG, according to the first comparison signal ZC from the output terminal of the first comparator CMP1, determines whether to trigger the compensation current supplying circuit NZC for outputting the compensation current Inzc to the power receiving component Rs according to the first error amplified signal EAO1 from the error amplifying circuit ER, so as to output a compensation triggering signal UMEN.

When the compensation trigger circuit CTG outputs the compensation triggering signal UMEN for triggering the compensation current supplying circuit NZC to output the compensation current Inzc to the power receiving component Rs according to the first error amplified signal EAO1, a voltage of the power receiving component Rs (such as the resistor) is increased along with an increase in the compensation current Inzc. As a result, a voltage of the second input terminal such as the inverting input terminal of the first comparator CMP1 is increased so as to change the first comparison signal ZC outputted by the output terminal of the first comparator CMP1.

The switch control circuit CTR is connected to a control terminal of the high-side switch HS and a control terminal of the low-side switch LS. The switch control circuit CTR, according to the first comparison signal ZC from the output terminal of the first comparator CMP1, outputs a plurality of switch controlling signals respectively to the control terminal of the high-side switch HS and the control terminal of the low-side switch LS for controlling the high-side switch HS and the low-side switch LS, so as to control the current flowing through the inductor L.

An output node between the second terminal of the inductor L and the first terminal of the output capacitor Cout is used as the output terminal of the power converter of the present disclosure, and is connected to the load. The load obtains appropriate power from the output terminal of the power converter of the present disclosure.

That is, the power converter of the present disclosure includes the negative current modulating circuit VYC1 configured to control the current flowing through the inductor L so as to control an output current that is supplied from the output terminal of the power converter of the present disclosure to the load. In particular, the negative current modulating circuit VYC1 of the power converter of the present disclosure changes a negative current flowing through the inductor L according to a transition in the load between the super light load, the medium load and the heavy load. When the load transits from the super light load to the medium load or the heavy load, the energy required for the load is increased. At this time, the negative current modulating circuit VYC1 reduces the negative current flowing through the inductor L, thereby reducing unnecessary power consumption. Therefore, the power converter of the present disclosure is capable of supplying appropriate power to the load that transits to the medium load or the heavy load.

Figure 2:
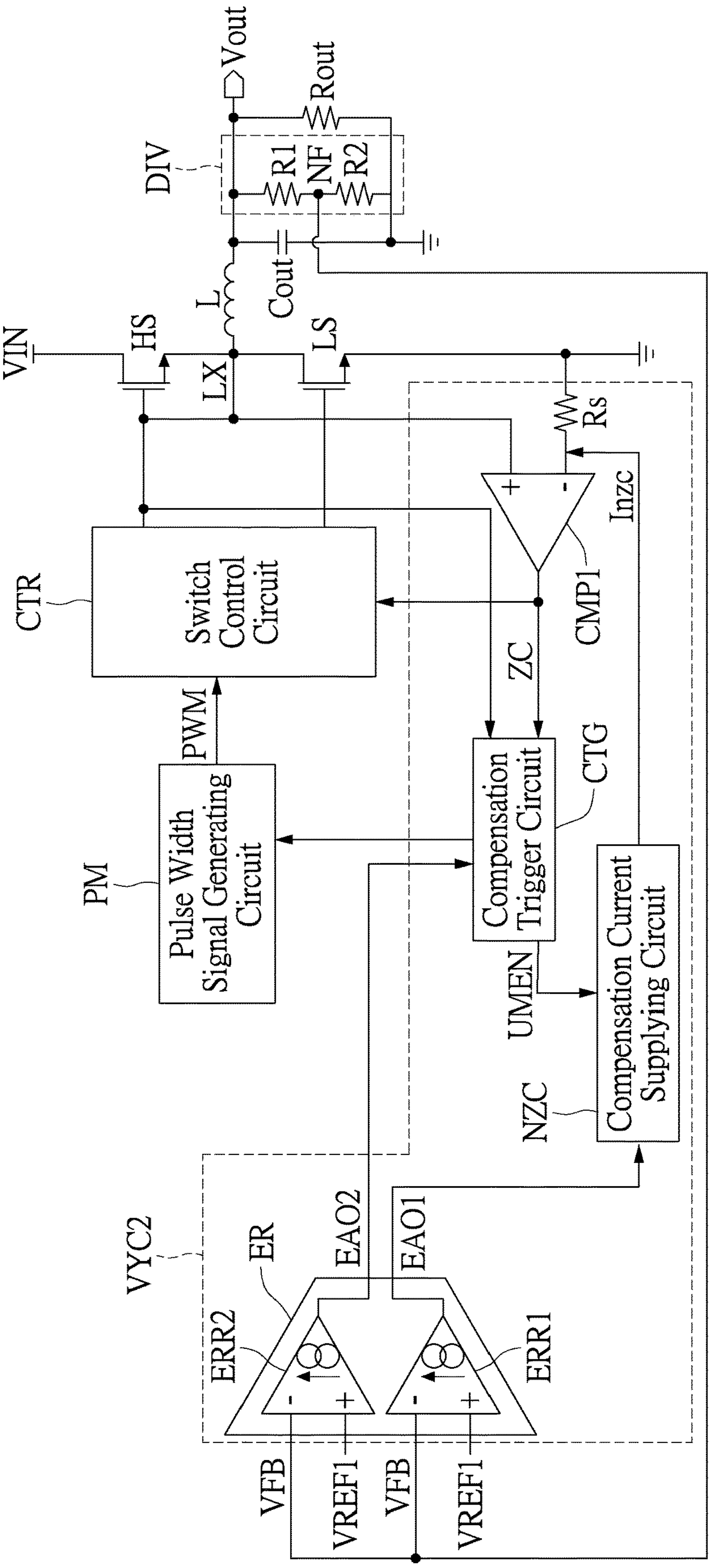
FIG. 2 is a circuit diagram of a power converter having a negative current control mechanism according to a second embodiment of the present disclosure.

Reference is made to FIG. 2, which is a circuit diagram of a power converter having a negative current control mechanism according to a second embodiment of the present disclosure. The descriptions of the second embodiment of the present disclosure that are the same as the descriptions of the first embodiment of the present disclosure are not repeated herein.

As shown in FIG. 2, in the second embodiment, the error amplifying circuit ER of the negative current modulating circuit VYC2 of the power converter of the present disclosure includes a first error amplifier ERR1 and a second error amplifier ERR2. The first error amplifier ERR1 and the second error amplifier ERR2 may be disposed inside the same one package as shown in FIG. 2 or may be separate from each other in practice, but the present disclosure is not limited thereto.

If necessary, the power converter of the present disclosure may further include a pulse width signal generating circuit PM, a voltage divider circuit DIV, an output resistor Rout or a combination thereof as shown in FIG. 2.

A first terminal of the output resistor Rout is connected to the first terminal of the inductor L. A second terminal of the output resistor Rout is grounded. The voltage divider circuit DIV is connected to the output node between the second terminal of the inductor L and the first terminal of the output capacitor Cout. The voltage divider circuit DIV may divide the output voltage Vout of the output node between the second terminal of the inductor L and the first terminal of the output capacitor Cout to output a divided voltage as the feedback voltage VFB.

For example, the divider circuit DIV includes a first voltage dividing resistor R1 and a second voltage dividing resistor R2. A first terminal of the first voltage dividing resistor R1 (that is an input terminal of the divider circuit DIV) is connected to the output node between the second terminal of the inductor L and the first terminal of the output capacitor Cout. A first terminal of the second voltage dividing resistor R2 is connected to a second terminal of the first voltage dividing resistor R1. A second terminal of the second voltage dividing resistor R2 is grounded.

As shown in FIG. 2, a first input terminal such as an inverting input terminal of the first error amplifier ERR1 and a first input terminal such as an inverting input terminal of the second error amplifier ERR2 may be connected to the output terminal of the divider circuit DIV. The output terminal of the divider circuit DIV is a feedback node NF between the first terminal of the second voltage dividing resistor R2 and the second terminal of the first voltage dividing resistor R1. In practice, the first input terminal of the first error amplifier ERR1 and the first input terminal of the second error amplifier ERR2 may be connected to the output node between the second terminal of the inductor L and the first terminal of the output capacitor Cout.

A second input terminal such as an inverting input terminal of the first error amplifier ERR1 and a second input terminal such as an inverting input terminal of the second error amplifier ERR2 are coupled with the first reference voltage VREF1.

An output terminal of the first error amplifier ERR is connected to the compensation current supplying circuit NZC. An output terminal of the second error amplifier ERR2 is connected to the compensation trigger circuit CTG.

A feedback voltage VFB of the feedback node NF is outputted to the first input terminal such as the inverting input terminal of the first error amplifier ERR1. The first error amplifier ERR1 multiplies the difference between the feedback voltage VFB and the first reference voltage VREF1 by the first gain to output the first error amplified signal EAO1.

When the compensation trigger circuit CTG outputs the compensation triggering signal UMEN for triggering the compensation current supplying circuit NZC to output the compensation current Inzc to the power receiving component Rs (such as the resistor) according to the first error amplified signal EAO1 from the output terminal of the first error amplifier ERR1, the voltage of the power receiving component Rs is increased along with the increase in the compensation current Inzc. As a result, the voltage of the second input terminal such as the inverting input terminal of the first comparator CMP1 is increased so as to change the first comparison signal ZC outputted by the output terminal of the first comparator CMP1.

The feedback voltage VFB is outputted to the first input terminal such as the inverting input terminal of the second error amplifier ERR2. The second error amplifier ERR2 multiplies the difference between the feedback voltage VFB and the first reference voltage VREF1 by a second gain to output a second error amplified signal EAO2. In the second embodiment, the second gain is not equal to the first gain.

The second error amplifier ERR2 multiplies the difference between the feedback voltage VFB and the first reference voltage VREF1 by a second gain to output a second error amplified signal EAO2. In the second embodiment, the second gain is not equal to the first gain.

The compensation trigger circuit CTG outputs a compensation instructing signal according to the second error amplified signal EAO2 from the second error amplifier ERR2.

The pulse width signal generating circuit PM outputs a pulse width modulation signal PWM according to the compensation instructing signal from the compensation trigger circuit CTG.

The switch control circuit CTR controls the high-side switch HS and the low-side switch LS according to the pulse width modulation signal PWM from the pulse width signal generating circuit PM. If the pulse width signal generating circuit PM is omitted in practice, the switch control circuit CTR may output the plurality of switch controlling signals directly according to the compensation instructing signal from the compensation trigger circuit CTG.

If necessary, the compensation trigger circuit CTG may, according to the plurality of switch controlling signal from the switch control circuit CTR, control a current value of the compensation current Inzc supplied to the power receiving component Rs (such as the resistor) by the compensation current supplying circuit NZC and a supply time of the compensation current Inzc.

Figure 3:
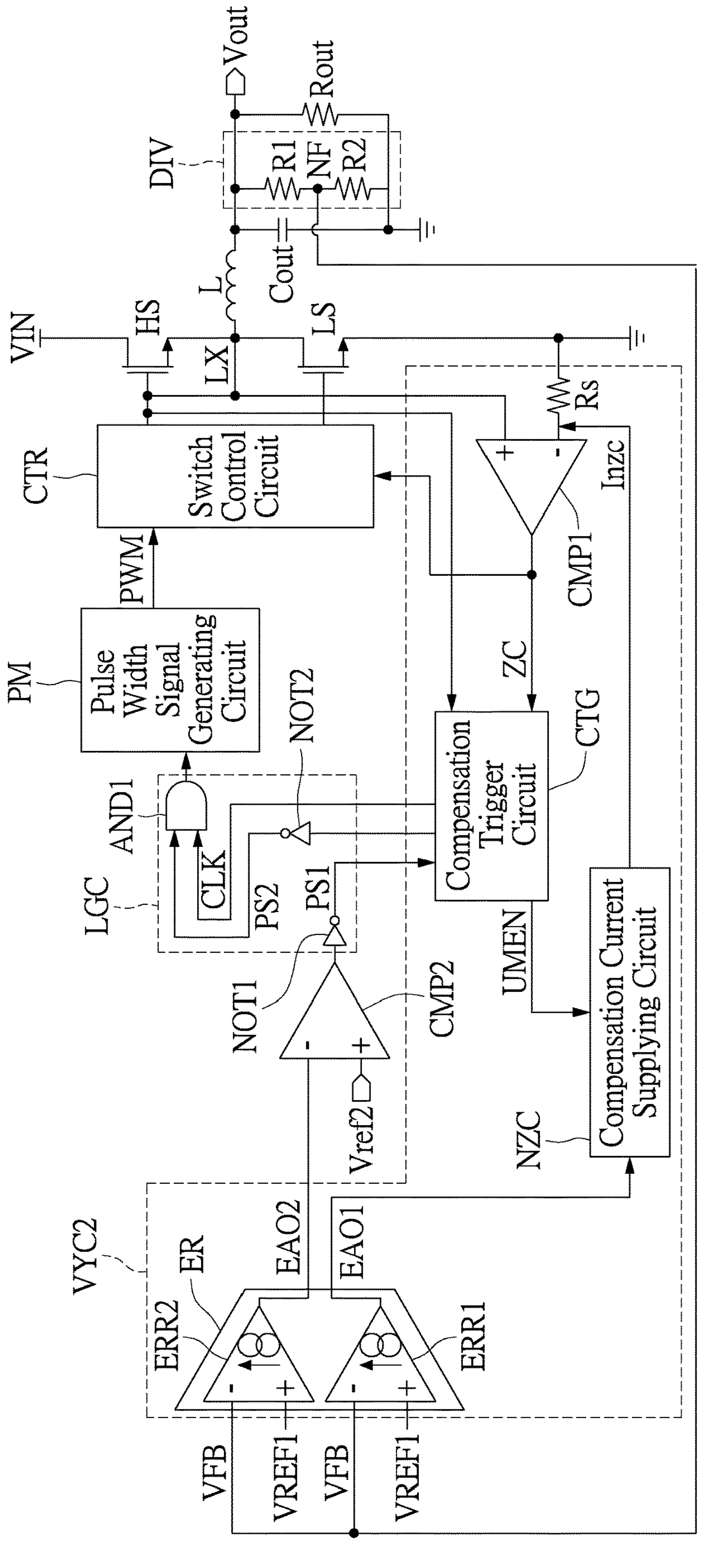
FIG. 3 is a circuit diagram of a power converter having a negative current control mechanism according to a third embodiment of the present disclosure.

Reference is made to FIG. 3, which is a circuit diagram of a power converter having a negative current control mechanism according to a third embodiment of the present disclosure. The descriptions of the third embodiment of the present disclosure that are the same as the descriptions of the first and second embodiments of the present disclosure are not repeated herein.

The power converter of the present disclosure may further include a second compactor CMP2, a logic circuit LGC or a combination thereof as shown in FIG. 3. For example, as shown in FIG. 3, the logic circuit LGC may include a first NOT gate NOT1, a second NOT gate NOT2 and an AND gate AND1 that may be replaced with other types of logic gates in practice.

A first input terminal such as an inverting input terminal of the second compactor CMP2 is connected to the output terminal of the second error amplifier ERR2. A second input terminal such as a non-inverting input terminal of the second compactor CMP2 is coupled with a second reference voltage VREF2. An output terminal of the second compactor CMP2 is connected to an input terminal of the first NOT gate NOT1. An output terminal of the first NOT gate NOT1 is connected to an input terminal of the compensation trigger circuit CTG.

An input terminal of the second NOT gate NOT2 is connected to a first output terminal of the compensation trigger circuit CTG. A first input terminal of the AND gate AND1 is connected to an output terminal of the second NOT gate NOT2. A second input terminal of the AND gate AND1 is connected to a second output terminal of the compensation trigger circuit CTG. An output terminal of the AND gate AND1 is connected to an input terminal of the pulse width signal generating circuit PM.

The second compactor CMP2 compares the second error amplified signal EAO2 from the output terminal of the error amplifying circuit ER with the second reference voltage VREF2 to output a second comparison signal. The first NOT gate NOT1 inverts a logic level of the second comparison signal to output a first NOT-gate signal PS1.

The compensation trigger circuit CTG, according to the first NOT-gate signal PS1 from the output terminal of the first NOT gate NOT1 of the logic circuit LGC (or the second comparison signal from the second compactor CMP2 in practice), outputs a compensation instructing signal PS2 to the input terminal of the second NOT gate NOT2 and outputs the clock signal CLK to the second input terminal of the AND gate AND1.

The pulse width signal generating circuit PM outputs the pulse width modulation signal PWM according to an AND-gate signal from the AND gate AND1. The switch control circuit CTR, according to the pulse width modulation signal PWM from the pulse width signal generating circuit PM, controls the high-side switch HS and the low-side switch LS so as to control the current flowing to the load through the inductor L.

Figure 4:
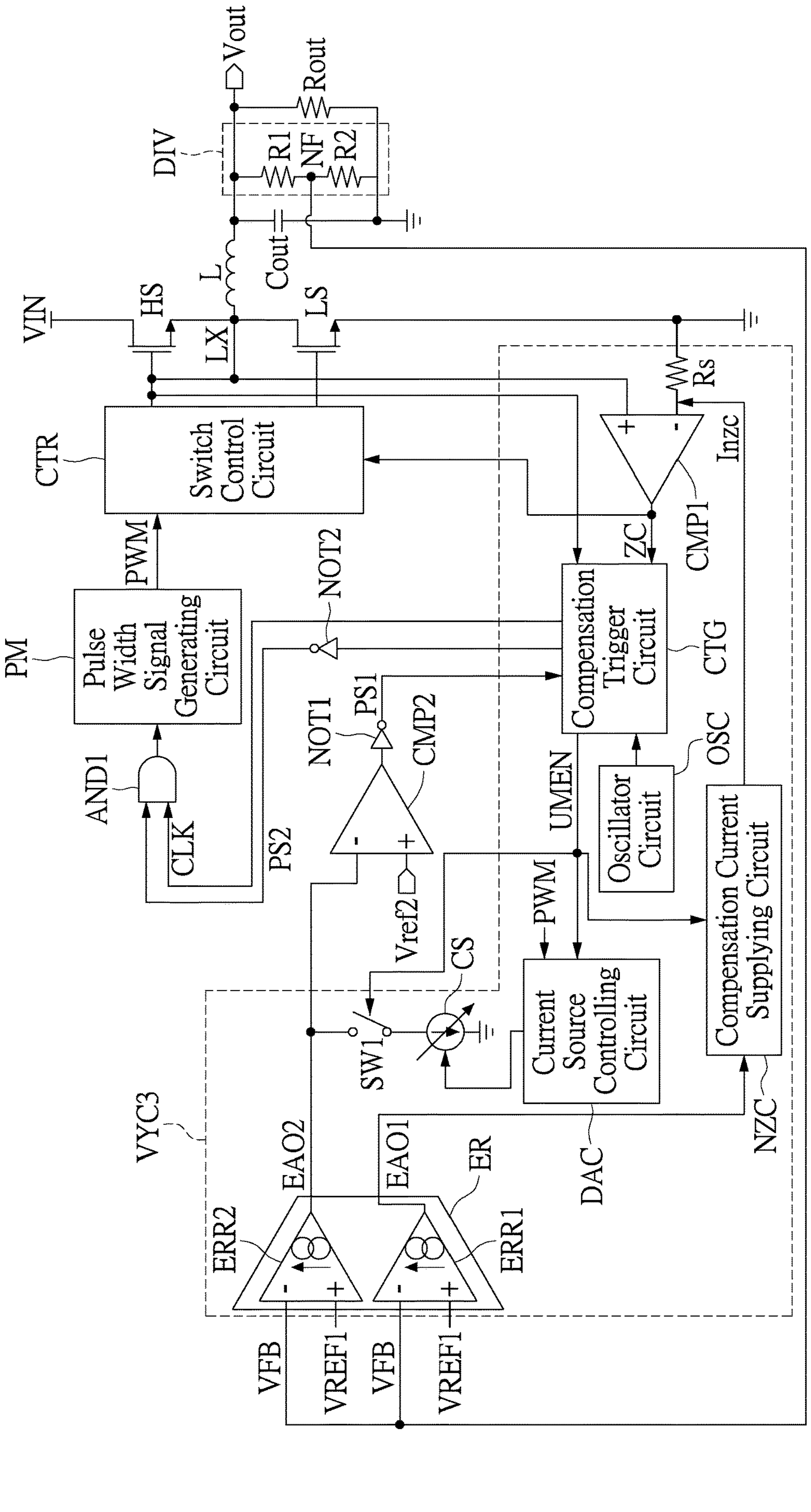
FIG. 4 is a circuit diagram of a power converter having a negative current control mechanism according to a fourth embodiment of the present disclosure.

Reference is made to FIG. 4, which is a circuit diagram of a power converter having a negative current control mechanism according to a fourth embodiment of the present disclosure.

The descriptions of the fourth embodiment of the present disclosure that are the same as the descriptions of the first to third embodiments of the present disclosure are not repeated herein.

The power converter of the fourth embodiment of the present disclosure may further include a compensation current source CS, a compensation switch SW1, a current source controlling circuit DAC, an oscillator circuit OSC or a combination thereof as shown in FIG. 4.

A first terminal of the compensation switch SW1 is connected to the output terminal of the second error amplifier ERR2. A second terminal of the compensation switch SW1 is connected to a first terminal of the compensation current source CS. A second terminal of the compensation current source CS may be grounded. An output terminal of the compensation trigger circuit CTG is connected to an input terminal of the current source controlling circuit DAC and a control terminal of the compensation switch SW1. An output terminal of the current source controlling circuit DAC is connected to a control terminal of the compensation current source CS.

The compensation trigger circuit CTG may operate according to a frequency of an oscillating signal from the oscillator circuit OSC. The compensation trigger circuit CTG outputs the compensation triggering signal UMEN according to the first comparison signal ZC from the output terminal of the first comparator CMP1.

The current source controlling circuit DAC may control the compensation current source CS to supply a current according to the compensation triggering signal UMEN from the compensation trigger circuit CTG (and the pulse width modulation signal PWM from the pulse width signal generating circuit PM). In addition or alternatively, the compensation trigger circuit CTG may output the compensation triggering signal UMEN to the control terminal of the compensation switch SW1 for switching the compensation switch SW1.

That is, in the power converter of the fourth embodiment of the present disclosure, operations of the compensation current source CS, the compensation switch SW1 or both are controlled by the first comparison signal ZC that is outputted according to a comparison result of the voltage of the second terminal of the power receiving component Rs and the voltage of the sensed node LX between the first terminal of the low-side switch LS and the second terminal of the high-side switch HS, and. By adjusting the operations of the compensation current source CS, the compensation switch SW1 or both, a voltage of the second error amplified signal EAO2 inputted to the first input terminal such as the inverting input terminal of the second compactor CMP2 is adjusted (e.g., is reduced). As a result, the switch control circuit CTR adjusts operations of the high-side switch HS and the low-side switch LS.

When the voltage of the second error amplified signal EAO2 is higher than the second reference voltage VREF2, the output terminal of the second compactor CMP2 outputs the second comparison signal at a low level. The low level of the second comparison signal is inverted into a high level. The second comparison signal at the high level as the first NOT-gate signal PS1 is inputted to the compensation trigger circuit CTG.

The compensation trigger circuit CTG, according to the first NOT-gate signal PS1 at the high level, outputs the compensation instructing signal PS2 at a high level to the input terminal of the second NOT gate NOT2. The high level of the compensation instructing signal PS2 is inverted into a low level. The compensation instructing signal PS2 at the low level is inputted to the first input terminal of the AND gate AND1.

The AND gate AND1, according to the compensation instructing signal PS2 at the low level, outputs the AND-gate signal at a low level to a second input terminal S of a pulse width signal generating circuit PM2 (such as an SR flip-flop). At this time, the pulse width signal generating circuit PM2 (such as the SR flip-flop) does not output the pulse width modulation signal PWM at a high level. That is, the pulse width signal generating circuit PM2 does not output a pulse wave in the pulse width modulation signal PWM for reducing a frequency of the pulse width modulation signal PWM. As a result, the working period of the pulse wave of the pulse width modulation signal PWM that is a time during which the high-side switch HS is turned on by the switch control circuit CTR is reduced.

For example, when the output voltage Vout of the present disclosure reaches an excessive voltage value, an on-time of the high-side switch HS is reduced for reducing the output voltage Vout of the present disclosure, thereby preventing the power converter of the present disclosure from being damaged due to the excessive output voltage Vout and the excessive output current of the present disclosure.

Figure 5:
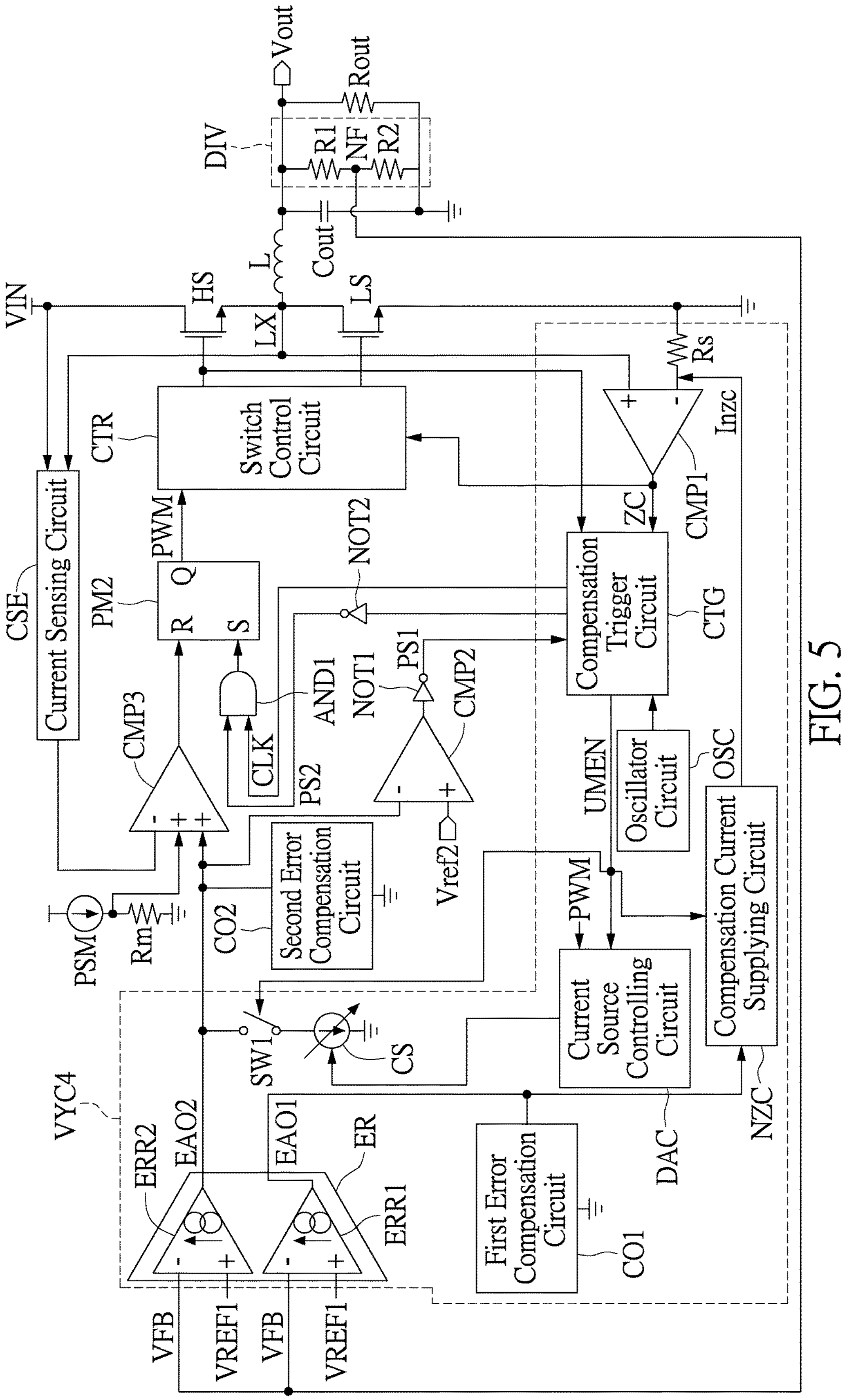
FIG. 5 is a circuit diagram of a power converter having a negative current control mechanism according to a fifth embodiment of the present disclosure.

Reference is made to FIG. 5, which is a circuit diagram of a power converter having a negative current control mechanism according to a fifth embodiment of the present disclosure. The descriptions of the second embodiment of the present disclosure that are the same as the descriptions of the first embodiment of the present disclosure are not repeated herein.

The negative current modulating circuit VYC4 of the power converter of the present disclosure may further include the first error compensation circuit CO1 as shown in FIG. 5. The power converter of the present disclosure may further include a second error compensation circuit CO2, a current sensing circuit CSE, a sensing comparator CMP3 (that is a comparator), a reference current source PSM, a reference resistor Rm of a combination thereof.

The first error compensation circuit CO1 is connected to a first transition node between the output terminal of the first error amplifier ERR1 and the input terminal of the compensation current supplying circuit NZC. The first error compensation circuit CO1 may compensate the first error amplified signal EAO1 that is transmitted through the first transition node from the output terminal of the first error amplifier ERR1. Then, the first error amplified signal EAO1 that is compensated is inputted to the compensation current supplying circuit NZC. The compensation current supplying circuit NZC may set the current value of the compensation current Inzc supplied to the power receiving component Rs according to the first error amplified signal EAO1 that is compensated by the first error compensation circuit CO1.

A first input terminal such as an inverting input terminal of the sensing comparator CMP3 is connected to an output terminal of the current sensing circuit CSE. The current sensing circuit CSE may be connected to or contacted with the first terminal of the high-side switch HS. The current sensing circuit CSE may sense a current flowing through the first terminal of the high-side switch HS to output a high-side sensed signal.

For example, the current sensing circuit CSE may convert the sensed current into a first sensed voltage and output the first sensed voltage to the first input terminal such as the inverting input terminal of the sensing comparator CMP3. Alternatively, the high-side sensed signal outputted by the current sensing circuit CSE is a current signal that flows into the sensing comparator CMP3 through the first input terminal such as the inverting input terminal of the sensing comparator CMP3 and then flows though an internal resistor of the sensing comparator CMP3 such that the internal resistor has the first sensed voltage.

A second input terminal such as a non-inverting input terminal of the sensing comparator CMP3 is connected to the output terminal of the second error amplifier ERR2, and receives the second error amplified signal EAO2 from the output terminal of the second error amplifier ERR2.

If necessary, the second error compensation circuit CO2 is connected to a second transmission node between the second input terminal such as the non-inverting input terminal of the sensing comparator CMP3 and the output terminal of the second error amplifier ERR2. The second error compensation circuit CO2 may compensate the second error amplified signal EAO2 that is transmitted through the second transmission node from the output terminal of the second error amplifier ERR2. The second error compensation circuit CO2 may output the second error amplified signal EAO2 that is compensated to the compensation current supplying circuit NZC.

A first terminal of the reference resistor Rm is connected to the reference current source PSM and a third input terminal such as a non-inverting input terminal of the sensing comparator CMP3. A second terminal of the reference resistor Rm is grounded. The reference current source PSM supplies a reference current to the reference resistor Rm. A voltage of the first terminal of the reference resistor Rm is inputted to the third input terminal such as the non-inverting input terminal of the sensing comparator CMP3.

An output terminal of the sensing comparator CMP3 is connected to the pulse width signal generating circuit PM2. The sensing comparator CMP3 may compare the voltage of the second error amplified signal EAO2 with the first sensed voltage to output a sensing comparing signal to the pulse width signal generating circuit PM2. In addition or alternatively, the sensing comparator CMP3 may compare the voltage of the first terminal of the reference resistor Rm with the first sensed voltage to output the sensing comparing signal to the pulse width signal generating circuit PM2.

The pulse width signal generating circuit PM2 outputs the pulse width modulation signal PWM to the switch control circuit CTR according to the sensing comparing signal from the output terminal of the sensing comparator CMP3.

For example, the pulse width signal generating circuit PM2 may include an SR flip-flop. A first input terminal R of the SR flip-flop is connected to the output terminal of the sensing comparator CMP3. The second terminal S of the SR flip-flop is connected to the output terminal of the AND gate AND1. An output terminal Q of the SR flip-flop is connected to an input terminal of the switch control circuit CTR.

The switch control circuit CTR, the current sensing circuit CSE, the compensation trigger circuit CTG, the oscillator circuit OSC, the compensation current supplying circuit NZC, the current source controlling circuit DAC, the first error compensation circuit CO1 and the second error compensation circuit CO2 may include one ore or more circuit components that may be configured according to actual requirements, but the power converter of the present disclosure is not limited thereto.

Figure 6:
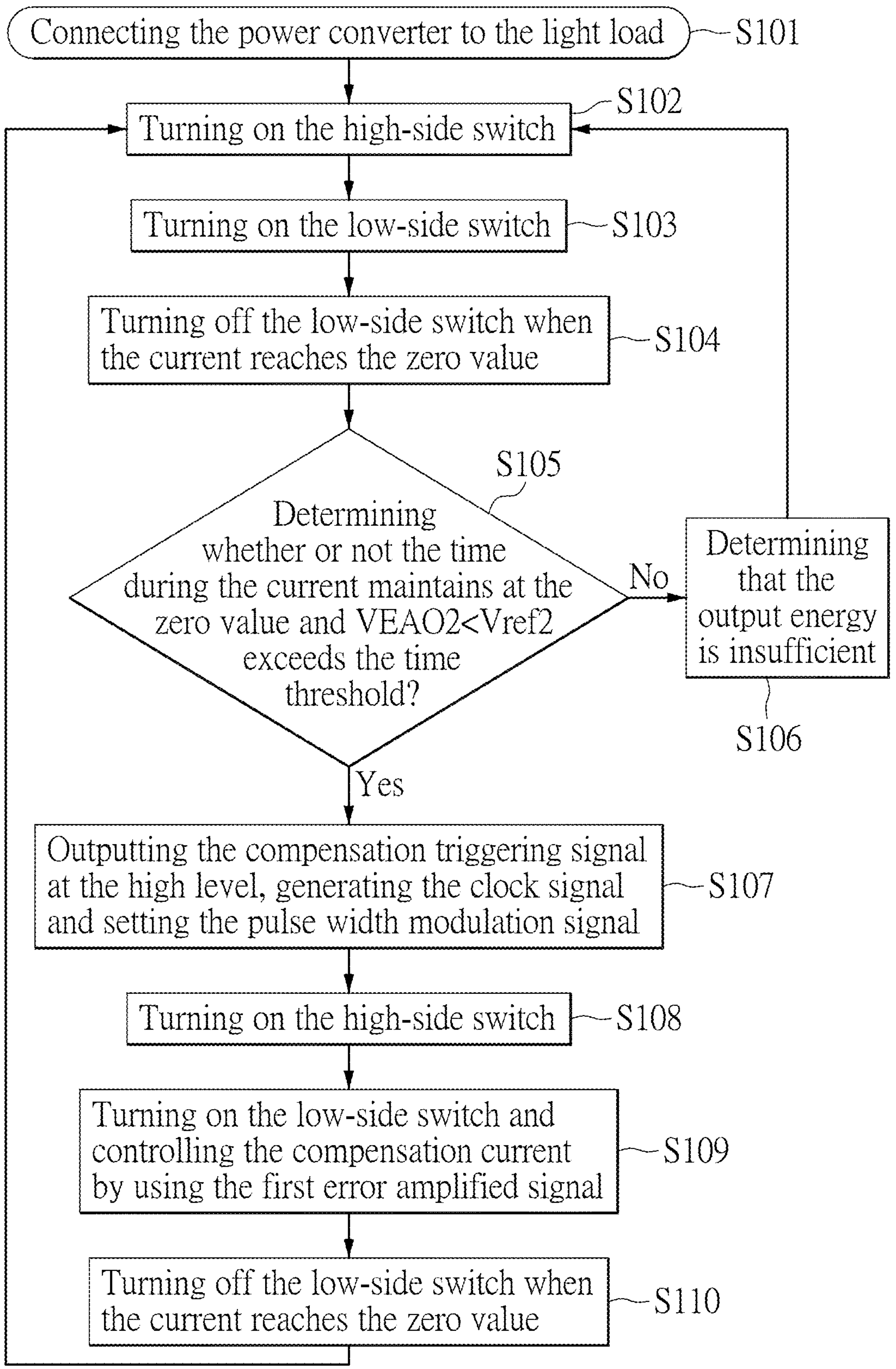
FIG. 6 is a flowchart diagram of a power converter having a negative current control mechanism according to a sixth embodiment of the present disclosure.

Reference is made to FIG. 6, which is a flowchart diagram of a power converter having a negative current control mechanism according to a sixth embodiment of the present disclosure.

The power converter shown in FIG. 5 performs processes S101 to S110 shown in FIG. 6.

In process S101, the output terminal of the power converter (that is the output node between the second terminal of the inductor L and the first terminal of the output capacitor Cout) is connected to the load that is the light load at this time.

In process S102, the switch control circuit CTR turns on the high-side switch HS and turns off the low-side switch LS such that the current that flows from the input voltage VIN sequentially through the high-side switch HS and the inductor L to the load is increased. For example, the current is increased to be equal to a current value of the reference current supplied by the reference current source PSM.

In process S103, the switch control circuit CTR turns on the low-side switch LS and turns off the high-side switch HS, and the current flows from the output capacitor Cout sequentially through the inductor L and the low-side switch LS to a ground until the voltage of the sensed node LX between the first terminal of the low-side switch LS and the second terminal of the high-side switch HS is discharged to a zero value.

In process S104, when the voltage of the sensed node LX between the first terminal of the low-side switch LS and the second terminal of the high-side switch HS is discharged to the zero value, the switch control circuit CTR turns off the low-side switch LS.

In process S105, the compensation trigger circuit CTG determines whether or not a time during which the first comparison signal ZC outputted by the first comparator CMP1 is maintained at a first reference level (such as a high level) and a voltage VEAO2 of the second error amplified signal EAO2 is lower than the second reference voltage VREF2 exceeds a time threshold. In other words, the compensation trigger circuit CTG determines whether or not the voltage of the sensed node LX between the first terminal of the low-side switch LS and the second terminal of the high-side switch HS is higher than the voltage of the first terminal of the power receiving component Rs (such as the resistor) and the voltage VEAO2 of the second error amplified signal EAO2 is lower than the second reference voltage VREF2 exceeds the time threshold. For example, the time length threshold is 30 us, but the present disclosure is not limited thereto.

If the time does not exceed the time threshold (that is an upper limit time length of supplying power to the load), process S106 is performed and then process S102 is performed again. Conversely, when the time exceeds the time threshold, processes S107 to S110 are sequentially performed.

In process S106, the compensation trigger circuit CTG determines that the power supplied to the load is insufficient, and thus determines that the switch control circuit CTR must adjust a switching state of the high-side switch HS and the low-side switch LS for increasing the output voltage Vout supplied to the load by the power converter so as to increase the voltage VEAO2 of the second error amplified signal EAO2 to be higher than the second reference voltage VREF2. Therefore, process S102 is then performed. In process S102, the switch control circuit CTR turns on the high-side switch HS and turns off the low-side switch LS such that the current that flows from the input voltage VIN through the high-side switch HS and the inductor L to the load is increased.

In process S107, the compensation trigger circuit CTG outputs the compensation triggering signal UMEN at a high level and outputs the clock signal CLK at a high level. The pulse width signal generating circuit PM2 outputs the pulse width modulation signal PWM at a high level according to the clock signal CLK at the high level.

In process S108, the switch control circuit CTR turns on the high-side switch HS and turns off the low-side switch LS such that the current that flows from the input voltage VIN sequentially through the high-side switch HS and the inductor L to the load is increased. For example, the current is increased to be equal to the current value of the reference current supplied by the reference current source PSM.

In process S109, the switch control circuit CTR turns off the high-side switch HS and turns on the low-side switch LS, and the compensation current supplying circuit NZC is triggered to set and control the compensation current Inzc outputted to the power receiving component Rs according to the first error amplified signal EAO1 by the compensation triggering signal UMEN at the high level.

In process S110, when the current that flows from the output capacitor Cout sequentially through the inductor L and the low-side switch LS to the ground is discharged to the zero value, the switch control circuit CTR turns off the low-side switch LS.

Figure 7:
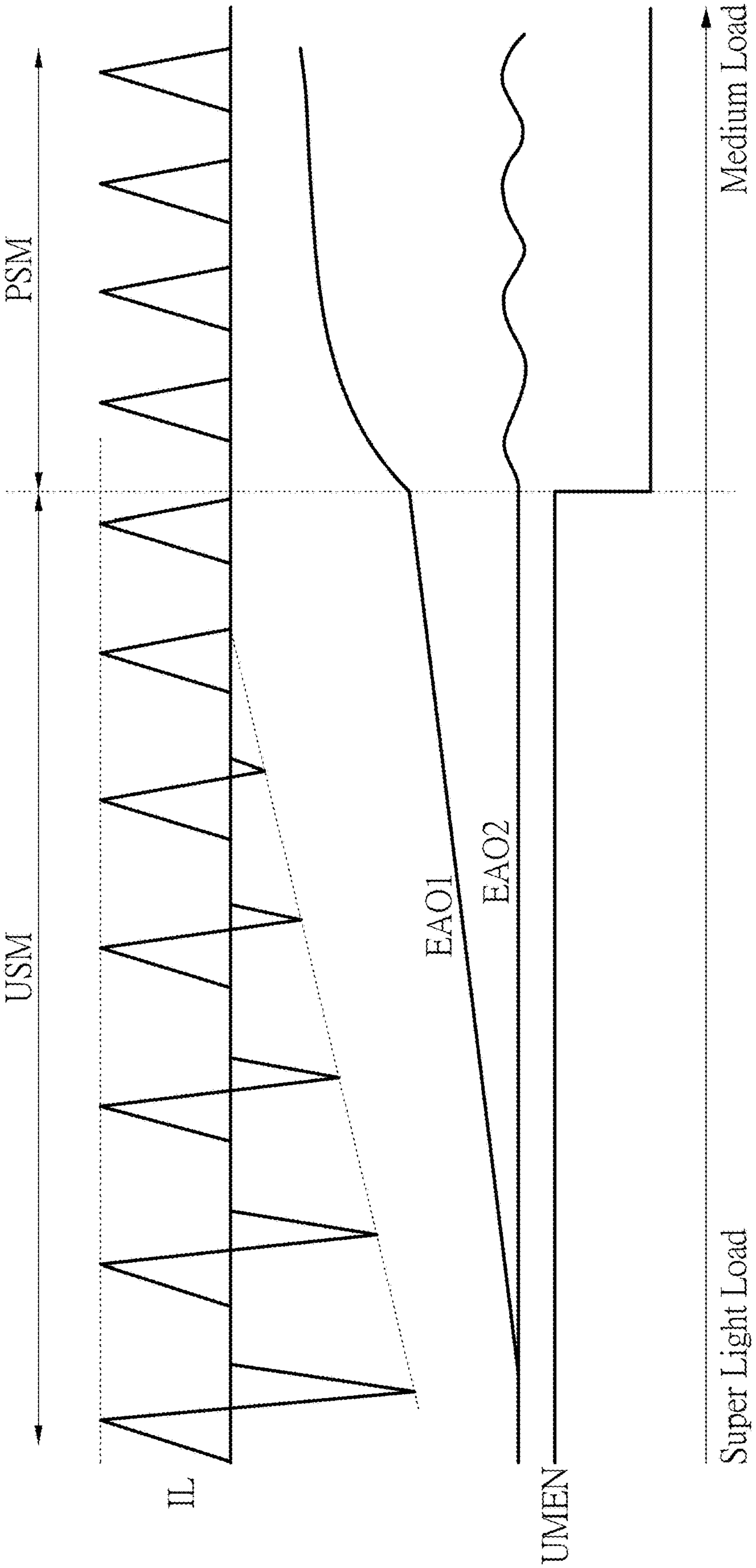
FIG. 7 is a waveform diagram of signals of the power converter having the negative current control mechanism according to the third to sixth embodiments of the present disclosure.
Figure 8:
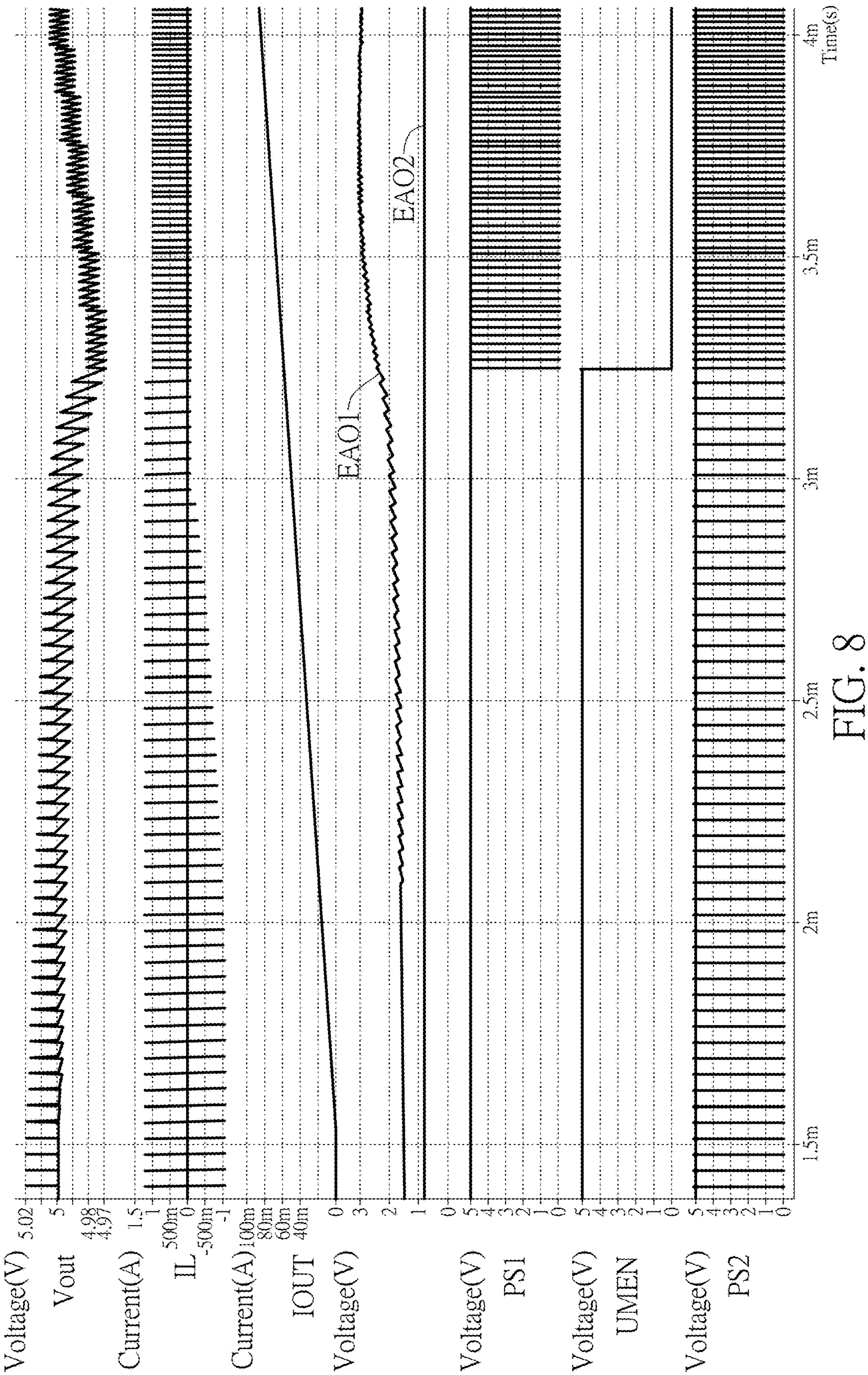
FIG. 8 is a waveform diagram of signals of the power converter having the negative current control mechanism according to the third to sixth embodiments of the present disclosure.
Figure 9:
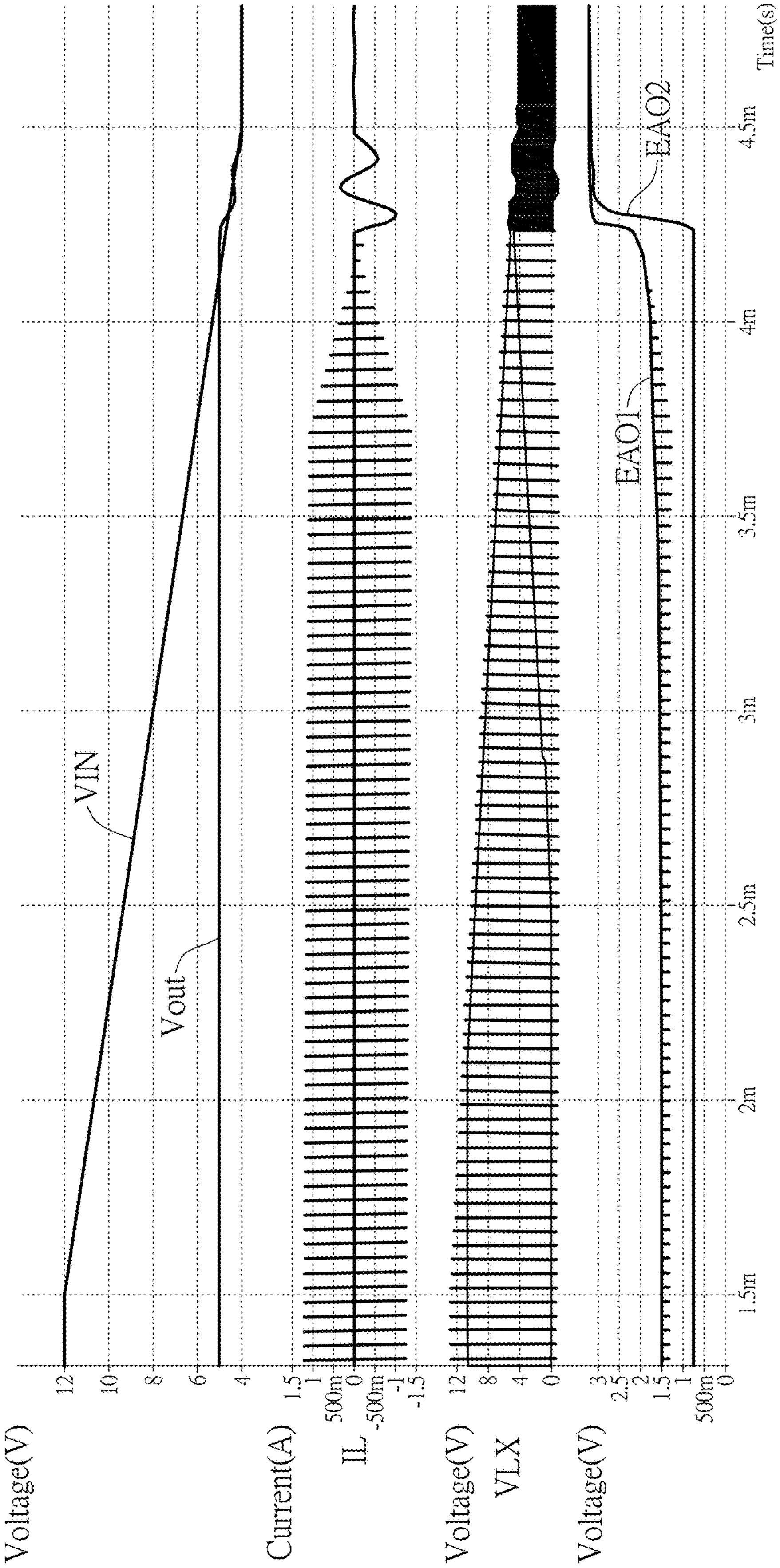
FIG. 9 is a waveform diagram of signals of the power converter having the negative current control mechanism according to the third to sixth embodiments of the present disclosure.

Reference is made to FIG. 7 to FIG. 9, which are waveform diagrams of signals of the power converter having the negative current control mechanism according to the third to sixth embodiments of the present disclosure.

The power converter of the present disclosure may be switched between a plurality of modes including an ultrasonic mode (USM) and a pulse skip mode as shown in FIG. 7. A current IL of the inductor L of the power converter of the present disclosure is changed with a change in energy required for the load.

The input voltage VIN, the output voltage Vout, the first NOT-gate signal PS1, the compensation triggering signal UMEN, the compensation instructing signal PS2, a sensed voltage VLX of the sensed node LX between the first terminal of the low-side switch LS and the second terminal of the high-side switch HS, the first error amplified signal EAO1 and the second error amplified signal EAO2 of the power converter of the present disclosure may be changed as shown in FIG. 8 and FIG. 9.

It is worth noting that, as shown in FIG. 7 and FIG. 8, when the load connected to the output terminal of the power converter of the present disclosure (that is the output node between the second terminal of the inductor L and the first terminal of the output capacitor Cout) gradually transits from the super light load to the medium load, a current IOUT required for the load is gradually increased. At this time, as shown in FIG. 8, the negative current (including a valley current) among the current IL of the inductor L is gradually reduced for reducing unnecessary energy consumption. As shown in FIG. 9, when the input voltage VIN is approximately equal to the output voltage Vout, the current IL of the inductor L is maintained at a constant value. Therefore, when the load connected to the output terminal of the power converter of the present disclosure is the medium load (or the heavy load in practice), the current IOUT of the power converter of the present disclosure is gradually increased such that the load obtains enough and stable power from the power converter of the present disclosure.

In conclusion, the present disclosure provides the power converter having the negative current control mechanism. In the power converter of the present disclosure, the switching state of the high-side switch and the low-side switch is changed according to the transition in the load between the super light load and the medium load or the heavy load so so to adjust the current flowing through the inductor. In particular, when the load transits from the super light load to the medium load or the heavy load, the power converter of the present disclosure is capable of reducing the negative current (including the valley current) among the current flowing through the inductor for reducing unnecessary power consumption. Therefore, the power converter of the present disclosure is capable of supplying enough power to the load, and the current of the inductor is maintained at the constant value when the input voltage is approximately equal to the output voltage.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a negative current control mechanism, comprising:

a high-side switch, wherein a first terminal of the high-side switch is coupled with an input voltage;

a low-side switch, wherein a first terminal of the low-side switch is connected to a second terminal of the high-side switch, a sensed node between the first terminal of the low-side switch and the second terminal of the high-side switch is connected to a first terminal of an inductor, a second terminal of the inductor is connected to a first terminal of an output capacitor, and a second terminal of the output capacitor is grounded;

a power receiving component, wherein a first terminal of the power receiving component is connected to a second terminal of the low-side switch;

a voltage divider circuit connected to the second terminal of the inductor, and configured to divide an output voltage of the second terminal of the inductor to output a divided voltage;

an error amplifying circuit connected to the voltage divider circuit and configured to multiply a difference between the divided voltage and a first reference voltage by a first gain to output a first error amplified signal;

a first comparator, wherein a first input terminal of the first comparator is connected to the sensed node, a second input terminal of the first comparator is connected to a second terminal of the power receiving component, and the first comparator compares a voltage of the sensed node with a voltage of the second terminal of the power receiving component to output a first comparison signal;

a switch control circuit connected to a control terminal of the high-side switch and a control terminal of the low-side switch, and configured to control the high-side switch and the low-side switch according to the first comparison signal;

a compensation trigger circuit connected to an output terminal of the first comparator; and a compensation current supplying circuit connected to the compensation trigger circuit and the second terminal of the power receiving component;

wherein the compensation trigger circuit, according to the first comparison signal, determines whether to trigger the compensation current supplying circuit to output a compensation current to the power receiving component according to the first error amplified signal;

wherein the error amplifying circuit includes:

a first error amplifier, wherein a first input terminal of the first error amplifier is connected to the voltage divider circuit, a second input terminal of the first error amplifier is coupled with the first reference voltage, and an output terminal of the first error amplifier outputs the first error amplified signal to the compensation current supplying circuit; and a second error amplifier, wherein a first input terminal of the second error amplifier is connected to the voltage divider circuit, a second input terminal of the second error amplifier is coupled with the first reference voltage, an output terminal of the second error amplifier is connected to the compensation trigger circuit, and the second error amplifier multiplies the difference between the divided voltage and the first reference voltage by a second gain to output a second error amplified signal;

wherein the compensation trigger circuit outputs a compensation instructing signal according to the second error amplified signal, and the switch control circuit controls the high-side switch and the low-side switch according to the compensation instructing signal.

2. The power converter according to claim 1, wherein the power receiving component includes a resistor.

3. The power converter according to claim 1, wherein the voltage divider circuit includes:

a first voltage dividing resistor, wherein a first terminal of the first voltage dividing resistor is connected to the second terminal of the inductor; and a second voltage dividing resistor, wherein a first terminal of the second voltage dividing resistor is connected to a second terminal of the first voltage dividing resistor, a second terminal of the second voltage dividing resistor is grounded, and a feedback node between the first terminal of the second voltage dividing resistor and the second terminal of the first voltage dividing resistor is connected to the first input terminal of the first error amplifier and the first input terminal of the second error amplifier.

4. The power converter according to claim 1, further comprising:

a pulse width signal generating circuit connected to the compensation trigger circuit, wherein the pulse width signal generating circuit outputs a pulse width modulation signal according to the compensation instructing signal, and the switch control circuit controls the high-side switch and the low-side switch according to the pulse width modulation signal.

5. The power converter according to claim 1, further comprising:

a second compactor, wherein a first input terminal of the second compactor is connected to the output terminal of the second error amplifier and configured to receive the second error amplified signal from the output terminal of the second error amplifier, a second input terminal of the second compactor is coupled with a second reference voltage, and an output terminal of the second compactor is connected to the compensation trigger circuit;

wherein the compensation trigger circuit outputs the compensation instructing signal according to a second comparison signal from the output terminal of the second compactor.

6. The power converter according to claim 5, further comprising:

a logic circuit connected to the compensation trigger circuit and the switch control circuit, wherein the logic circuit outputs a logic signal according to the compensation instructing signal, and the switch control circuit controls the high-side switch and the low-side switch according to the logic signal.

7. The power converter according to claim 6, wherein the logic circuit includes:

a first NOT gate, wherein an input terminal of the first NOT gate is connected to the output terminal of the second compactor, and an output terminal of the first NOT gate is connected to an input terminal of the compensation trigger circuit.

8. The power converter according to claim 7, the logic circuit further includes:

a second NOT gate, wherein an input terminal of the second NOT gate is connected to a first output terminal of the compensation trigger circuit; and an AND gate, wherein a first input terminal of the AND gate is connected to an output terminal of the second NOT gate, a second terminal of the AND gate is connected to a second output terminal of the compensation trigger circuit, and an output terminal of the AND gate is connected to an input terminal of the switch control circuit;

wherein the compensation trigger circuit, according to a first NOT-gate signal from the output terminal of the first NOT gate, outputs a compensation logic signal to the input terminal of the second NOT gate, and outputs a clock signal to the second terminal of the AND gate.

9. The power converter according to claim 1, further comprising:

a compensation current source; and a compensation switch, wherein a first terminal of the compensation switch is connected to the output terminal of the second error amplifier, a second terminal of the compensation switch is connected to a first terminal of the compensation current source, a control terminal of the compensation switch is connected to the compensation trigger circuit, and the compensation trigger circuit controls the compensation switch according to the first comparison signal.

10. The power converter according to claim 9, further comprising:

a current source controlling circuit connected to the compensation trigger circuit and a control terminal of the compensation current source, wherein the compensation trigger circuit instructs the current source controlling circuit to control the compensation current source according to the first comparison signal.

11. The power converter according to claim 1, further comprising:

a first error compensation circuit connected to the output terminal of the first error amplifier and the compensation current supplying circuit, and configured to compensate the first error amplified signal transmitted between the output terminal of the first error amplifier and the compensation current supplying circuit.

12. The power converter according to claim 11, further comprising:

a second error compensation circuit connected to the output terminal of the second error amplifier and the compensation current supplying circuit, and configured to compensate the second error amplified signal transmitted between the output terminal of the second error amplifier and the compensation current supplying circuit.

13. The power converter according to claim 1, further comprising:

a current sensing circuit, wherein the current sensing circuit senses a current flowing through the first terminal of the high-side switch to output a high-side sensed signal, and the switch control circuit controls the high-side switch and the low-side switch according to the high-side sensed signal.

14. The power converter according to claim 13, further comprising:

a sensing comparator, wherein the sensing comparator is a comparator, a first input terminal of the sensing comparator is connected to the current sensing circuit and configured to receive the high-side sensed signal from the current sensing circuit, a second input terminal of the sensing comparator is connected to the output terminal of the second error amplifier, an output terminal of the sensing comparator is connected to the pulse width signal generating circuit, and the pulse width signal generating circuit outputs the pulse width modulation signal to the switch control circuit according to both of a sensing comparing signal from the sensing comparator and the pulse width modulation signal.

15. The power converter according to claim 14, further comprising:

a reference current source configured to supply a reference current; and a reference resistor, wherein a first terminal of the reference resistor is connected to the reference current source and a third input terminal of the sensing comparator, and a second terminal of the reference resistor is grounded.

16. The power converter according to claim 1, further comprising:

an oscillator circuit connected to the compensation trigger circuit, and configured to operate according to a frequency of an oscillating signal from the oscillator circuit.

17. The power converter according to claim 1, further comprising:

an output resistor, wherein a first terminal of the output resistor is connected to the first terminal of the inductor, and a second terminal of the output resistor is grounded.

* * * * *